(12) United States Patent
Hancock

(10) Patent No.: US 9,475,536 B1
(45) Date of Patent: Oct. 25, 2016

(54) DRIVEN WHEEL WITH ANIMATED IMAGE

(71) Applicant: Philippa Claire Barbara Hancock, Beaconsfield (GB)

(72) Inventor: Philippa Claire Barbara Hancock, Beaconsfield (GB)

( * ) Notice: Subject to any disclaimer, the term of this patent is extended or adjusted under 35 U.S.C. 154(b) by 0 days.

(21) Appl. No.: 14/836,523

(22) Filed: Aug. 26, 2015

(51) Int. Cl.
*A63H 33/38* (2006.01)
*B62K 9/02* (2006.01)
*B62K 9/00* (2006.01)

(52) U.S. Cl.
CPC .. *B62K 9/02* (2013.01); *B62K 9/00* (2013.01)

(58) Field of Classification Search
USPC ....... 446/147, 149, 151, 236, 237, 436, 457; 434/101, 104, 402, 403
See application file for complete search history.

(56) References Cited

U.S. PATENT DOCUMENTS

| | | | | |
|---|---|---|---|---|
| 64,117 A * | 4/1867 | Lincoln | ................. | G03B 21/32 352/101 |
| 972,344 A * | 10/1910 | Davis | .................... | G03B 21/32 352/101 |
| 1,014,365 A * | 1/1912 | Bourgin | ................ | G03B 21/32 352/101 |
| 1,925,136 A * | 9/1933 | Conover | ................ | A63H 33/22 229/5.5 |
| 8,373,842 B1 * | 2/2013 | Seder | ..................... | G03B 25/00 352/101 |
| 9,170,479 B1 * | 10/2015 | Kosakura | ............... | G03B 23/10 |
| 2003/0223042 A1 * | 12/2003 | Rudnick | ............... | G03B 25/00 352/101 |
| 2009/0168023 A1 * | 7/2009 | Tang | ..................... | G03B 21/006 353/13 |
| 2010/0195054 A1 * | 8/2010 | Gant | ..................... | G03B 29/00 352/102 |
| 2013/0162951 A1 * | 6/2013 | Buyssens | .............. | G03B 25/00 352/102 |

FOREIGN PATENT DOCUMENTS

GB 2493168 * 1/2013 ............ G03B 25/00

* cited by examiner

*Primary Examiner* — Kurt Fernstrom
(74) *Attorney, Agent, or Firm* — Michael D. Eisenberg

(57) ABSTRACT

A driven wheel with a rotational axis comprises an annular rim member 13 with an annular inner surface 12 supporting a series of progressively changing representations 17A and with a series of apertures 15 through which the representations can be seen from outside the rim. The driven wheel includes drive means 20 to impart horizontal force to the wheel axis, in use, said wheel can be placed on a surface and said drive means causing the wheel to rotate about its axis as the wheel moves over the surface, the representations providing an animated image when in motion. The wheel takes to form of a zoetrope. The driven wheel may be part of a push along toy (FIG. 1) or a child's tricycle (FIG. 2).

9 Claims, 2 Drawing Sheets

DRIVEN WHEEL WITH ANIMATED IMAGE

TECHNICAL FIELD

The present invention relates to a driven wheel with animated image.

BACKGROUND OF THE INVENTION

The subject invention generally relates to a driven wheel with a rotational axis comprising an annular rim member with an annular inner surface supporting a series of progressively changing representations and with a series of apertures through which the representations can be seen from outside the rim. The representations provide an animated image.

BRIEF SUMMARY OF EMBODIMENTS OF THE INVENTION

According to one embodiment of the invention, According to the present invention there is provided a driven wheel with a rotational axis having an annular rim member with an annular inner surface supporting a series of progressively changing representations and with a series of apertures through which the representations can be seen from outside the rim, and drive or drive means to impart horizontal force to the wheel axis, in use said wheel can be placed on a surface and said drive or drive means causing the wheel to rotate about its axis as the wheel moves over the surface.

In one embodiment the annular rim includes an inner transparent annular wall and an outer wall providing said annular inner surface which is concentric with the inner wall and spaced therefrom to define an annular gap to accommodate said representations. The representations may be on a strip of material.

In another embodiment, the representations are provided separately and separate representation holders are provided radially spaced around the annular inner surface. The outer surface may be of a dark color or shade, e.g. black.

The drive or drive means may be a shaft connected to the wheel axis which can be pushed by a person to impart said horizontal force. The shaft and wheel may form a push along toy.

The drive or drive means may be a vehicle with wheels and one of said wheels maybe a wheel of the invention. The vehicle may be a child's push along cycle.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
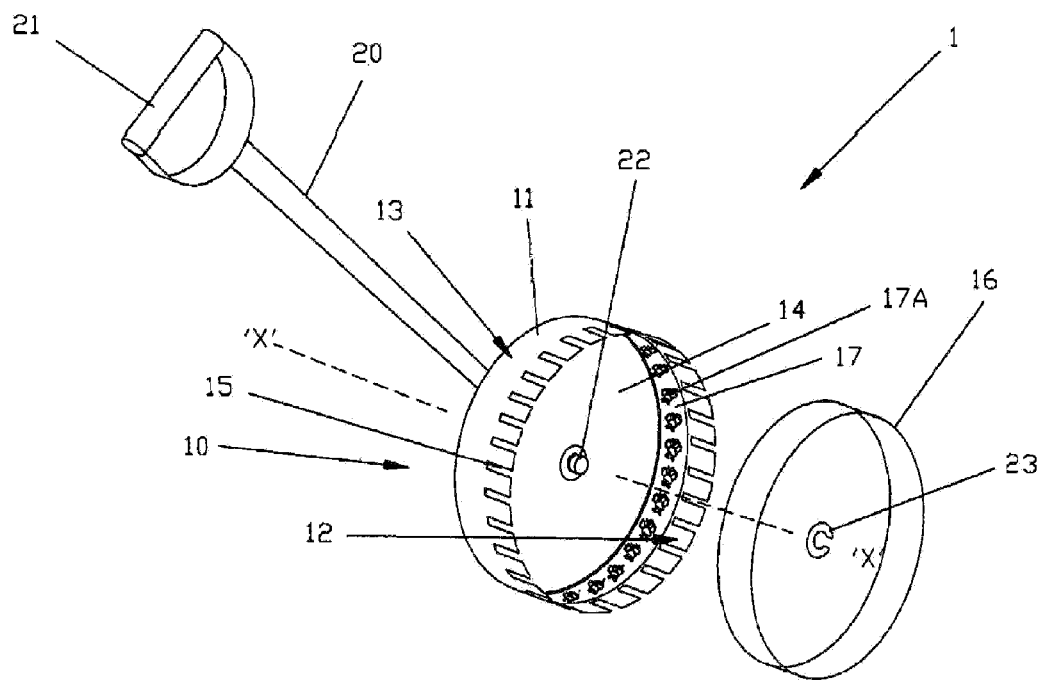
FIG. 1 shows a push along toy incorporating the driven wheel.

Referring to FIG. 1 there is shown a push along toy 1 with a wheel 10 with a rotational axis x-x.

Wheel 10 has an annular rim member outer wall 11 with an annular inner surface 12 and a parallel outer surface 13. A circular face plate 14 is provided on one side of the outer wall 11 with a central aperture on the rotational axis. A series of apertures in the form of slits 15 extend in from the other side of the outer wall and are radially spaced equally around the rim member 11.

An inner transparent annular wall 16 is provided normally concentric with the outer wall and defines an annular gap. A strip of material 17 such as paper or card is provided and is sandwiched in the gap between the inner and outer walls 16,11. Material 17 supports a series of progressively changing representations in the form of 2D pictures 17A.

A shaft 20 has a handle 21 at one end and an axle 22 at the other end extending normal to the shaft 20. A C-clip 23 secures the circular face 14 to the axle 22. Shaft 20 forms a drive or drive means and can be pushed by a person to impart a horizontal force to axis of the wheel 10.

The shaft 20 and wheel 10 form a push along toy. In use, wheel 10 can be placed on a surface such as the floor, and the shaft is pushed by a user and the wheel rotates about its axis as the wheel moves over the surface. The user can look at the pictures 17A through the slits 15 which create an animated movie clip like a zoetrope or praxinoscope.

Figure 2:
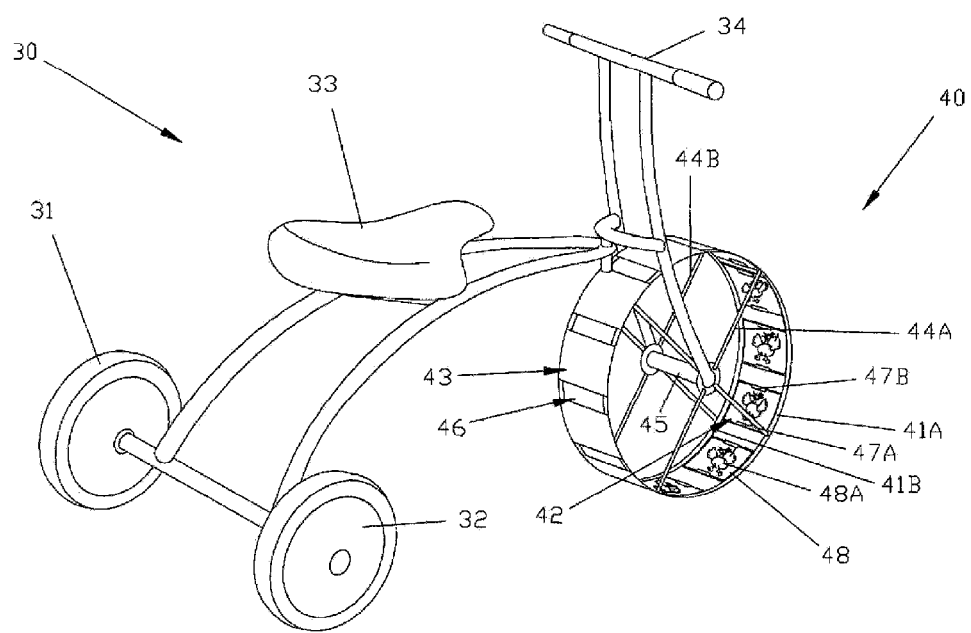
FIG. 2 shows a push along cycle incorporating the driven wheel.

Referring now to FIG. 2 there is shown a child's push along tricycle 30. Tricycle 30 has a pair of rear wheels 31,32, a seat 33, and a steering forks and handle bar 34 supporting a wheel according to the present invention.

Wheel 40 has a pair of annular rim members 41A,41B with an annular inner surface 42 and a parallel outer surface 43. Two sets of spokes 44A,44B are provided on each rim members 41A,41B. Spokes 44A,44B radiate from an axis 45. A series of apertures in the form of slits 46 extend between the rim members 41A,41B and are radially spaced equally around the rim members.

Between the slits 46 on the inner surface 42 are opposing radially spaced pairs of L-shaped lugs 47A,47B. Pairs of Lugs 47A,47B form holders to support cards 4K supporting a series of progressively changing representations in the form of 2D pictures 48A.

In use, a child can sit on the seat 33 of the tricycle 30 placed on a surface such as the floor and push it along with his or her feet so imparting a horizontal force to wheel 40 which rotates about its axis as the wheel moves over the surface. The child can look at the pictures 48A through the slits 46 which create an animated movie clip like a zoetrope or praxinoscope.

The invention may take a form different to that specifically described above. The outer surface of the wheel may be or dark color or shade (e.g. black) to make the pictures more visible through the slits. The driven wheel may be part of a toy pram. At least part of the construction of the wheel in FIG. 1 could be used in the tricycle of FIG. 2, and at least part of the construction of the wheel in FIG. 2 could be used in the toy of FIG. 1.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. In addition, when a single callout line in the drawings leads to two or more separate reference numbers (first, second, etc. reference numbers), (and each reference numeral refers to a different piece of text in the detailed description) and it would be inconsistent to designate the drawing item being called out as both pieces of text, the drawing be interpreted as illustrating two different variants. In one variant, the drawing item is referred to by the first reference number and in another variant the drawing item is referred to by the second reference number, etc.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether CTRL logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A driven wheel with a rotational axis, the driven wheel, having an annular rim member with an annular inner surface supporting a series of progressively changing representations and with a series of apertures through which the representations can be seen from outside the rim, the wheel also having a drive to impart horizontal force to the wheel axis;

wherein, in use, when said wheel is placed on a surface, said drive enables the wheel to rotate about its axis as the wheel moves over the surface.

2. The driven wheel of claim 1, wherein the annular rim includes an inner transparent annular wall and an outer wall providing said annular inner surface which is concentric with the inner wall and spaced therefrom to define an annular gap to accommodate said representations.

3. The driven wheel of claim 2, wherein the representations are on a strip of material.

4. The driven wheel of claim 2, wherein the representations are provided separately and separate representation holders are provided spaced around the annular inner surface.

5. The driven wheel of claim 4, wherein the outer surface is of a dark color or shade.

6. The driven wheel of claim 2, wherein the drive comprises a shaft connected to the wheel axis which can be pushed by a person to impart said horizontal force.

7. The driven wheel of claim 6, wherein the shaft and wheel form a push along toy.

8. The driven wheel of claim 1, wherein the drive is a vehicle with wheels, said driven wheel being one of the wheels of the vehicle.

9. The driven wheel of claim 8, wherein the vehicle is a child's push along cycle.

* * * * *